(12) United States Patent
Kanie et al.

(10) Patent No.: US 6,290,201 B1
(45) Date of Patent: Sep. 18, 2001

(54) ANTI-VIBRATION HOLDING ELEMENT

(75) Inventors: H. Kanie; T. Kakehi; O. Uemura, all of Toyohashi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/292,706

(22) Filed: Apr. 15, 1999

(30) Foreign Application Priority Data

Apr. 16, 1998 (JP) .................................................. 10-106654

(51) Int. Cl.⁷ .................................................. F16M 13/00
(52) U.S. Cl. .......................... 248/636; 248/68.1; 248/562
(58) Field of Search .................................. 248/636, 638, 248/600, 562, 58, 68.1, 71, 74.1, 74.2, 74.3

(56) References Cited

U.S. PATENT DOCUMENTS

| | | | |
|---|---|---|---|
| 4,116,411 | * 9/1978 | Masuda | 248/60 |
| 4,381,275 | 4/1983 | Sorensen | 264/328.8 |
| 4,422,995 | 12/1983 | Schad | 264/250 |
| 4,459,256 | 7/1984 | Ziegler | 264/152 |
| 4,508,676 | 4/1985 | Sorensen | 264/328.8 |
| 4,881,705 | * 11/1989 | Kraus | 248/74.2 |
| 4,935,184 | 6/1990 | Sorensen | 264/246 |
| 5,002,243 | * 3/1991 | Kraus | 248/68.1 |
| 5,033,701 | * 7/1991 | Kraus | 248/68.1 |
| 5,170,984 | 12/1992 | Ruckwardt | 248/635 |
| 5,184,794 | 2/1993 | Saito | 248/68.1 |
| 5,277,387 | 1/1994 | Lewis et al. | 248/74.2 |
| 5,316,245 | 5/1994 | Ruckwardt | 248/68.1 |
| 5,464,179 | 11/1995 | Ruckwardt | 248/68.1 |
| 5,588,683 | 12/1996 | Schliessner | 285/62 |
| 5,906,342 | 4/1999 | Kraus | 248/74.1 |
| 5,954,300 | 9/1999 | Sturies et al. | 248/68.1 |
| 6,036,145 | * 3/2000 | Calabrese et al. | 248/68.1 |

FOREIGN PATENT DOCUMENTS

| | | |
|---|---|---|
| 19818002 | 10/1999 | (DE) . |
| 0230553 | 11/1986 | (EP) . |
| 0886093 | 12/1998 | (EP) . |
| 1-121782 | 8/1989 | (JP) . |
| 4-75289 | 6/1992 | (JP) . |
| 5-73389 | 10/1993 | (JP) . |

* cited by examiner

Primary Examiner—Anita M. King
Assistant Examiner—Gwendolyn Baxter
(74) Attorney, Agent, or Firm—Edward D. Murphy

(57) ABSTRACT

An anti-vibration holding element 1 for holding pipes 46 and 48 includes a securing part 3, which is connected to a pipe holding part 2. An anti-vibration member 5 is located on an outer circumferential surface of the securing part 3, and between the connected securing part and the pipe holding part 2. The securing part 3 is formed separately from the pipe holding part 2, which is formed with a base 12. An accommodating portion of the base 12, including the outer circumferential surface, receives the securing part 3. When the securing part 3 is located in the base 12 of the pipe holding part 2, the anti-vibration member 5 connects the securing part and the holding part by the fitting of the member on to the base. To facilitate attachment of the holding element 1 to a body 49, the securing part 3 is formed with spaced, opposed claws 27 which engage and attach to a grooved stud 50 welded to the body.

9 Claims, 8 Drawing Sheets

ANTI-VIBRATION HOLDING ELEMENT

BACKGROUND OF THE INVENTION

The invention relates to an anti-vibration holding element that is used to mount mounting members such as fuel pipes or brake pipes on to the body of a vehicle or the like, provided with anti-vibration means such that vibration from the mounted member is not transmitted to the body or vibration from the body is not transmitted to the mounted member.

Holding elements made of synthetic resin are known whereby a mounted member such as a fuel pipe or brake pipe is held on an automobile body. In such holding elements, anti-vibration holding elements are known in which an anti-vibration member is provided made of vibration-absorbing material, such that vibration coming from the fuel pipe or brake pipe is not transmitted to the body. For example, Laid-Open Japanese Utility Model Publication No. H.1-121782 discloses an anti-vibration holding element whereby a pipe is mounted on a body by linking a securing part and a pipe holding part by insertion of anti-vibration material between a securing part fixed to the body and a pipe holding part that holds the pipe. This anti-vibration holding element maintains quietness within the vehicle chamber since vibration generated by the pipe is not transmitted to the body.

In order to fix the securing part of the anti-vibration holding element to the body, the claw of a foot of the securing part was pushed into a mounting hole of the body, passing through the mounting hole of the body, and mounting was effected by means of the claw of the foot projecting at the inner side of the body and an anti-vibration rubber element at the outer side of the body, utilising the resilience of the anti-vibration rubber element. If the foot of the securing part is not pushed into the mounting hole of the body in a correct attitude (attitude normal to the body surface), the foot claw cannot pass through the mounting hole in a correct attitude, so mounting by means of the resilience of the rubber element cannot be achieved. For example, when pipe holding parts which are on both sides of a securing part are pushed in, a force in an inclined direction is applied to the securing part and this sometimes made correct mounting impossible. Also, when mounting, in a condition in which the leading end of the foot of the securing part was placed in a region where no mounting hole of the body was provided, if some part other than the securing part (for example the pipe holding part) was strongly pushed in, an opposing force was applied from the body to the leading end of the securing part; this sometimes caused the securing part to escape from the anti-vibration rubber element. Laid-Open Utility Model Publication No.

H.5-73389 and Laid-Open Utility Model Publication No. H.4-75289 disclose anti-vibration holding elements wherein a pipe holding part comprising an anti-vibration member is joined to a securing part by fixing this securing part to the body using a securing element comprising a nut and bolt. With this anti-vibration holding element, mounting on the body is stable, but, since the pipe is held by the anti-vibration member, the pipe holding force is weak and a cover or the like is necessary in order to strengthen the holding force.

SUMMARY OF THE INVENTION

An object of the invention is therefore to provide an anti-vibration holding element wherein, whilst maintaining the anti-vibration function, a pipe can be securely held without requiring a cover, and wherein mounting on to the body can be performed in a simple and appropriate manner without requiring special skill.

DETAILED DESCRIPTION OF THE INVENTION

Figure 1:
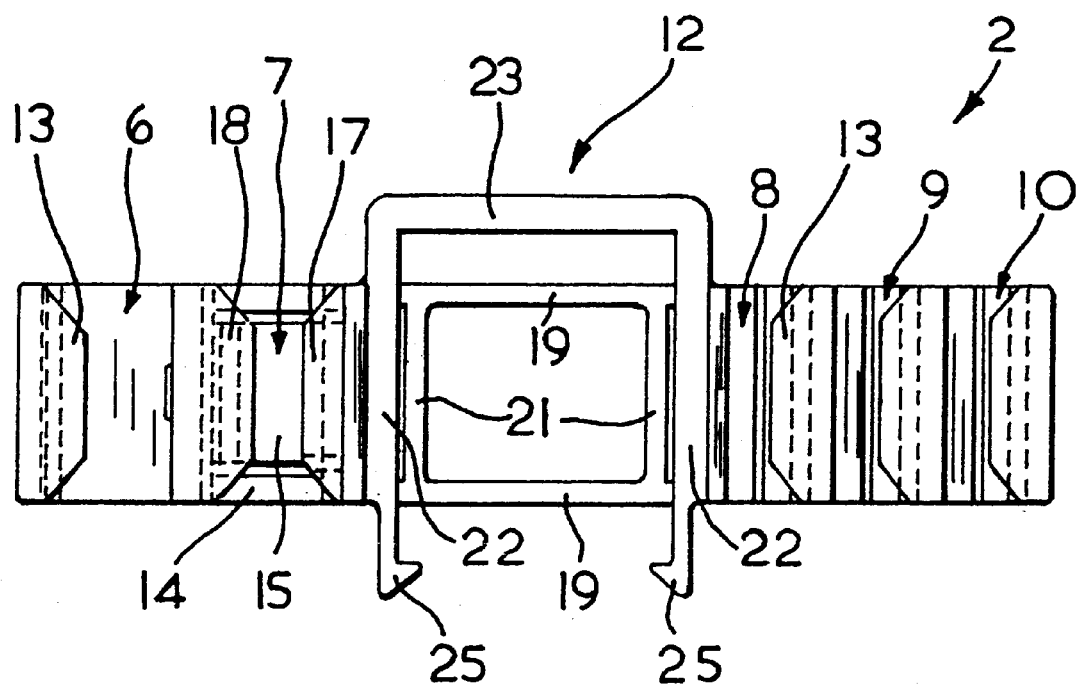
FIG. 1 is a plan view of a pipe holding part of an anti-vibration holding element according to a first embodiment of the invention.

According to the invention of claim 1 there is provided an anti-vibration holding element comprising a securing part mounted on a body by mounting means and a holding part that holds a member to be mounted that is to be mounted on to the body by connection with this securing part, and provided with anti-vibration means that prevent transmission of vibration between the securing part and holding part, between the securing part and holding part; wherein the securing part is formed separately from the holding part and has a shape enabling fitting into an accommodating portion of the base formed in this holding part, an anti-vibration member being provided at the periphery of this securing part at a portion that fits on to the base of the holding part, this anti-vibration member effecting connection of the securing part and holding part simply by this anti-vibration member fitting on to the base of the holding part.

As a more specific example of such an anti-vibration holding element, there is provided an anti-vibration holding element for pipe holding comprising a securing part that is mounted on a body by mounting means when pushed on to the body, and a pipe holding part having pipe holding means that hold a pipe and connected to the securing part, and provided with anti-vibration means that prevent transmission of vibration between the securing part and pipe holding part; wherein the securing part and pipe holding part are separately formed, the pipe holding part comprises pipe holding means and a base whereby the securing part is connected, an accommodating portion whereby the securing part is received is formed in the base, an anti-vibration member is provided on the circumferential surface of the securing part, and, when the securing part is accommodated in the base of the pipe holding part, the anti-vibration member connects the securing part and holding part simply by the anti-vibration member fitting into this base.

As described above, the securing part is mounted in a simple and suitable manner simply by pressing on to the body, the strength of the mounting of the securing part on to the body is maintained at a high level, and the anti-vibration member whereby the pipe holding part is linked prevents the securing part from coming into direct engagement with the pipe holding part, so the basic anti-vibration function is maintained at a high level and furthermore the pipe is held by a hard pipe holding part rather than a soft anti-vibration material, so it is held in a stable and firm manner. The mounting strength of the securing part is therefore high and there is no possibility of the mounting becoming detached.

With the anti-vibration holding element the accommodating portion of the base of the pipe holding part is formed in a shape such that the securing part fitted with an anti-vibration member is received by inserting and sliding in a direction at right angles to the direction of pushing-on of the securing part, and a withdrawal-preventing claw can be provided at the inlet of this base accommodating portion such as to prevent withdrawal of the securing part fitted with an anti-vibration member once this has been received; in this way, a securing part fitted with an anti-vibration member can be assembled in a simple manner on to a pipe holding part. Since this securing part is formed with flanges at both ends in the direction of pushing-on of the securing part, the anti-vibration member can be received and held between these two flanges; in this way, withdrawal of the anti-vibration member in the axial direction of the stud from the securing part is prevented and the securing part is reliably fixed. Preferably, a pair of insertion guides extending in the sliding direction of the securing part are formed at the base of the pipe holding part, insertion grooves matching these insertion guides being formed on the side faces of the anti-vibration member. In this way, the assembly operation is further facilitated and is performed reliably. The anti-vibration member may be mounted so that it can be removed from the securing part, or may be integrally joined to the supporting part. Also, if a rod-shaped stud erected on the body is employed as mounting means, the securing part may be formed with a stud receiving hole and an engagement claw that engages with a screw-thread groove or circumferential grooves of the stud. If a body hole is utilized as mounting means, a clip that is engaged by insertion into the body hole may be provided on the securing part.

Figure 11:
FIG. 11 is a partial front view of an anti-vibration member showing a modification of the anti-vibration member.
Figure 12:
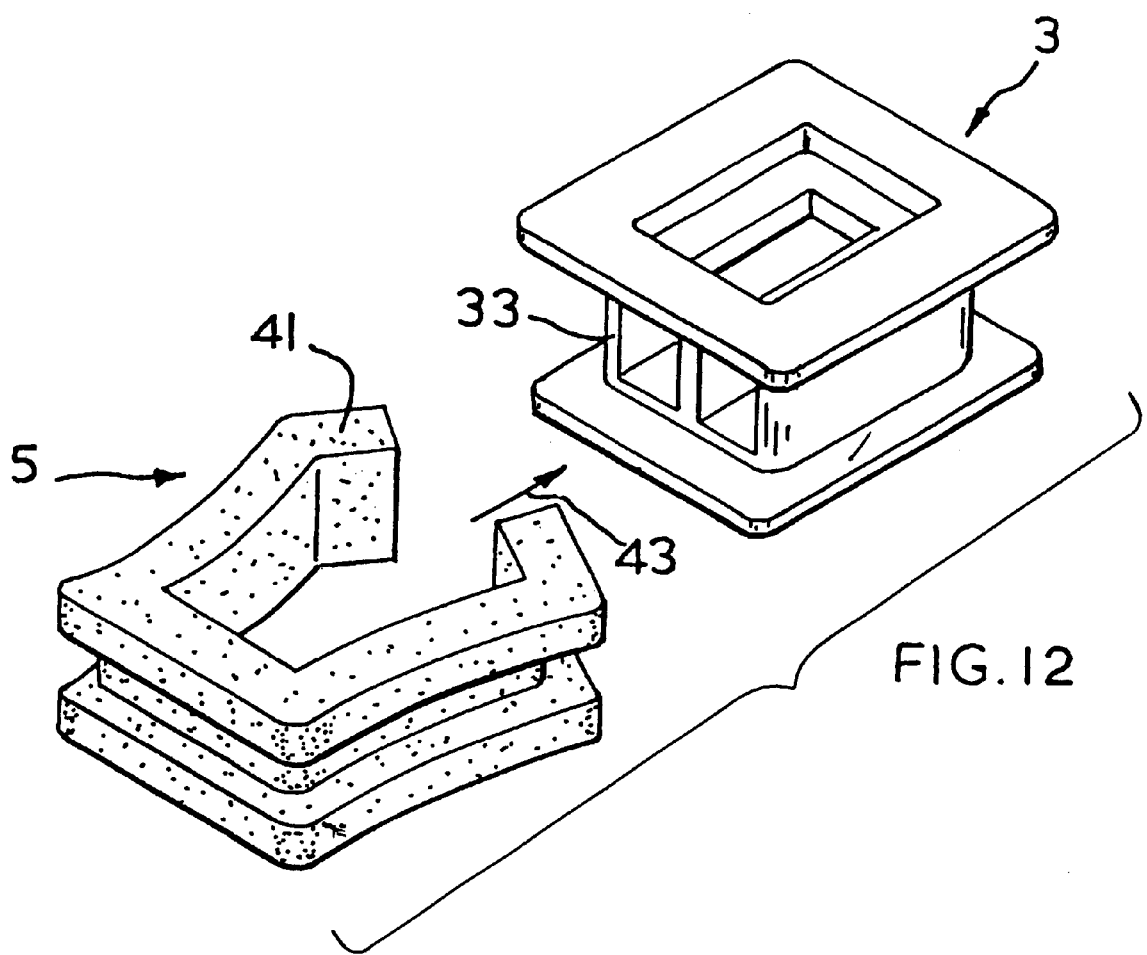
FIG. 12 is a perspective view showing the operation of mounting the anti-vibration member on to the securing part.
Figure 13:
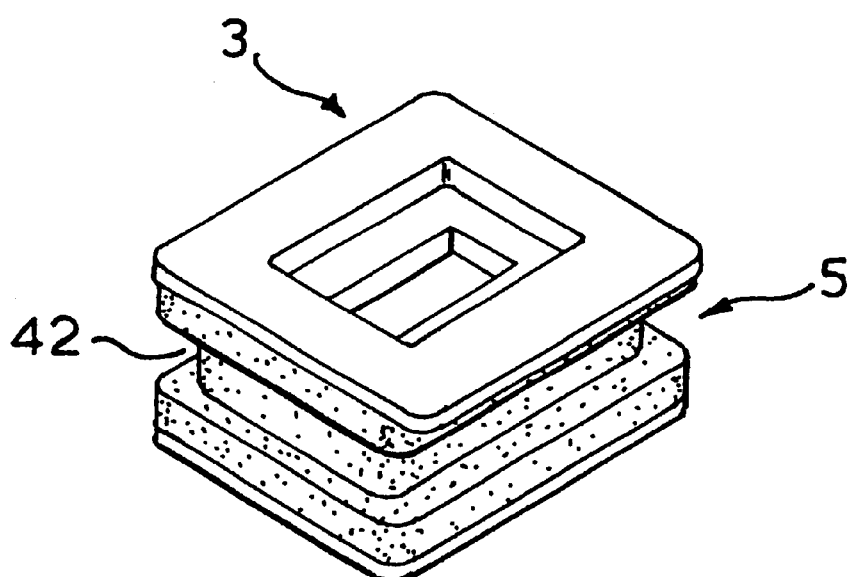
FIG. 13 is a perspective view showing the condition after mounting the anti-vibration member on to the securing part.
Figure 14:
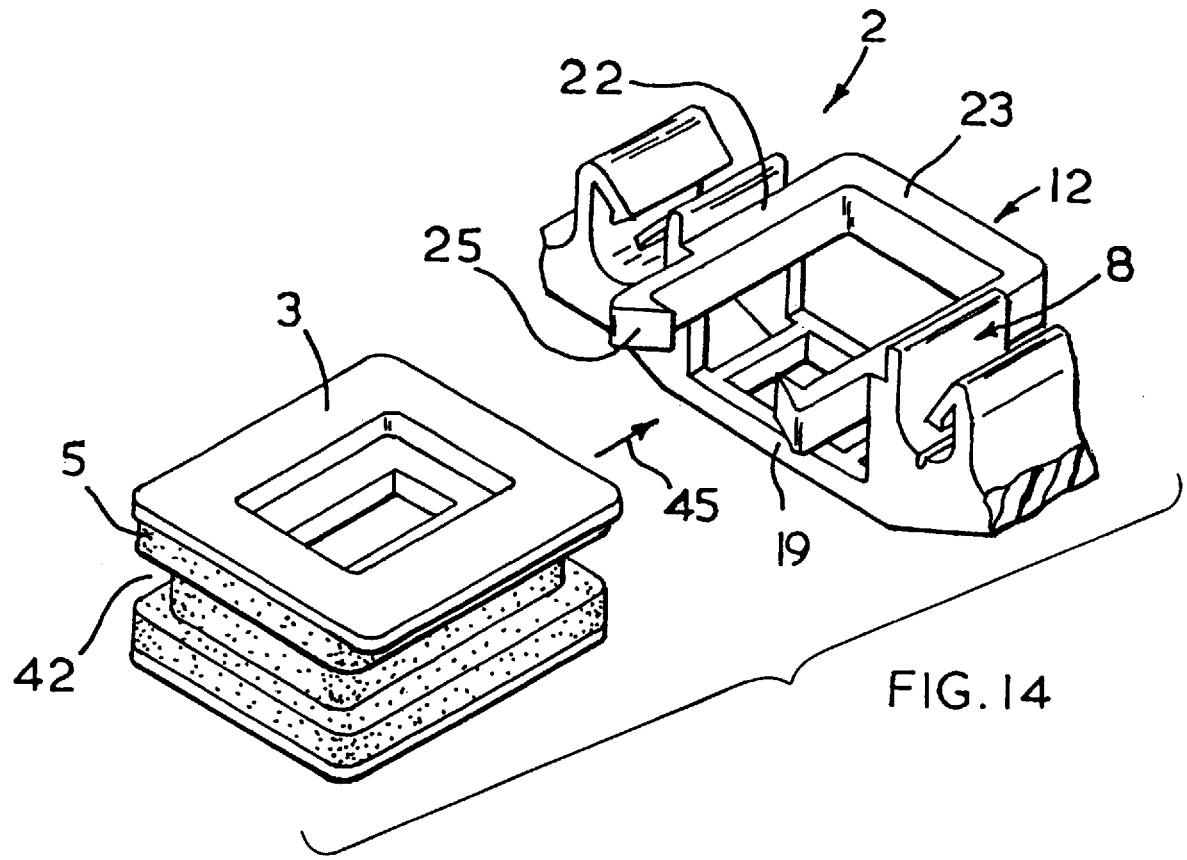
FIG. 14 is a diagram illustrating the operation of mounting a securing part fitted with an anti-vibration member on to a pipe holding part.
Figure 15:
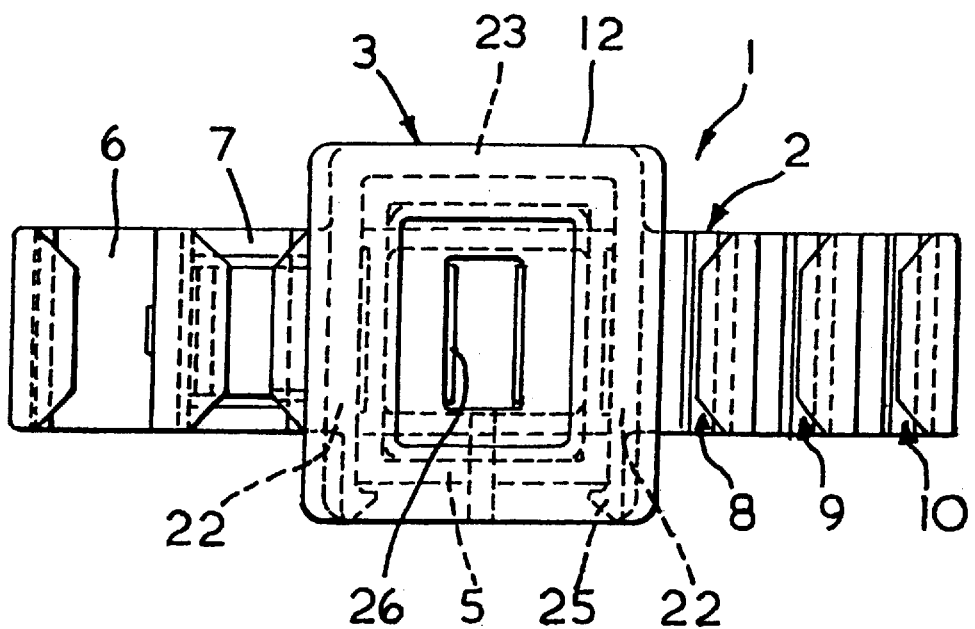
FIG. 15 is a plan view after completion of assembly of an anti-vibration holding element according to the first embodiment of the invention.
Figure 16:
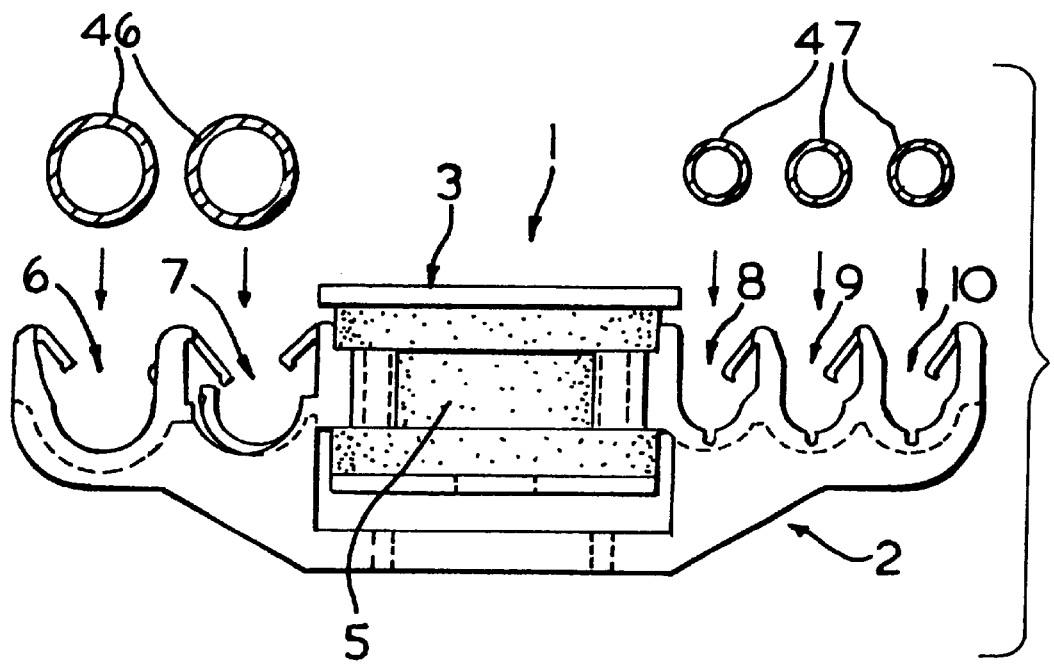
FIG. 16 is a front view showing how the anti-vibration holding element of FIG. 15 is mounted.
Figure 17:
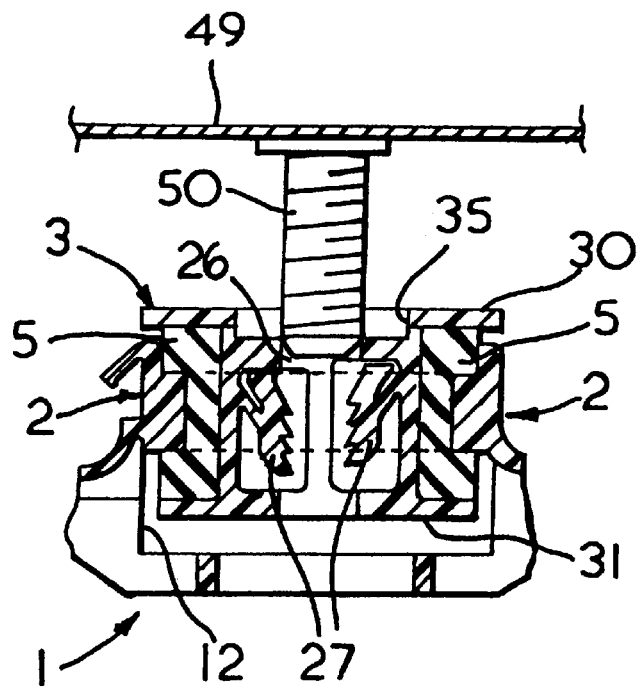
FIG. 17 is a partial cross-sectional view showing how the anti-vibration holding element of the first embodiment of the invention is engaged with a stud.

Embodiments of the invention are described below with reference to the drawings. FIG. 1 to FIG. 17 illustrate an anti-vibration holding element 1 according to a first embodiment of the invention. Anti-vibration holding element 1 comprises a pipe holding part 2 shown in FIG. 1 to FIG. 3 and a securing part 3 shown in FIG. 4 to FIG. 8; securing part 3 is joined to pipe holding part 2 by mounting a rubber anti-vibration member 5 shown in FIG. 9 to FIG. 11 on securing part 3. Anti-vibration member 5 is integrally assembled with securing part 3 as shown in FIG. 13 by assembling it on to the securing part 3 as shown in FIG. 12. FIG. 14 shows how a securing part 3 with anti-vibration member 5 attached is joined to pipe holding part 2 by inserting it into a receiving part at the base of the pipe holding part 2. FIG. 15 and FIG. 16 show an anti-vibration holding element 1 constituted by joining pipe holding part 2 and securing part 3 with anti-vibration member 5 attached. FIG. 17 shows how an anti-vibration element 1 engages a stud erected on the body. Pipe holding part 2 and securing part 3 are respectively made of hard plastics material in order to hold the pipe reliably and to effect rigid securing on to the body. Anti-vibration member 5 consists of material having the ability to absorb vibration; typically it consists of natural rubber material or synthetic rubber material, which are commonly used as vibration-absorbing materials. In the embodiment illustrated, the member to be mounted on to the body is a pipe, so the holding part for the member to be mounted is formed as a pipe holding part. However, in this invention, the member to be mounted is not restricted to being a pipe and any type of member to be mounted on to the body could be employed. The holding part for the member to be mounted can also be formed as required in conformity with the member to be mounted.

Figure 2:
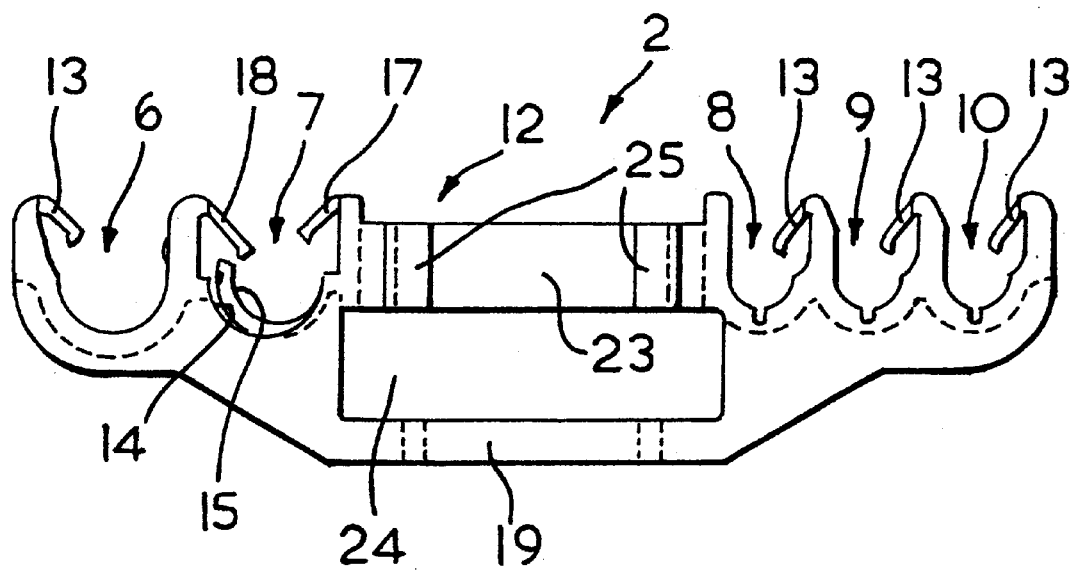
FIG. 2 is a front view of a pipe holding part according to FIG. 1.
Figure 3:
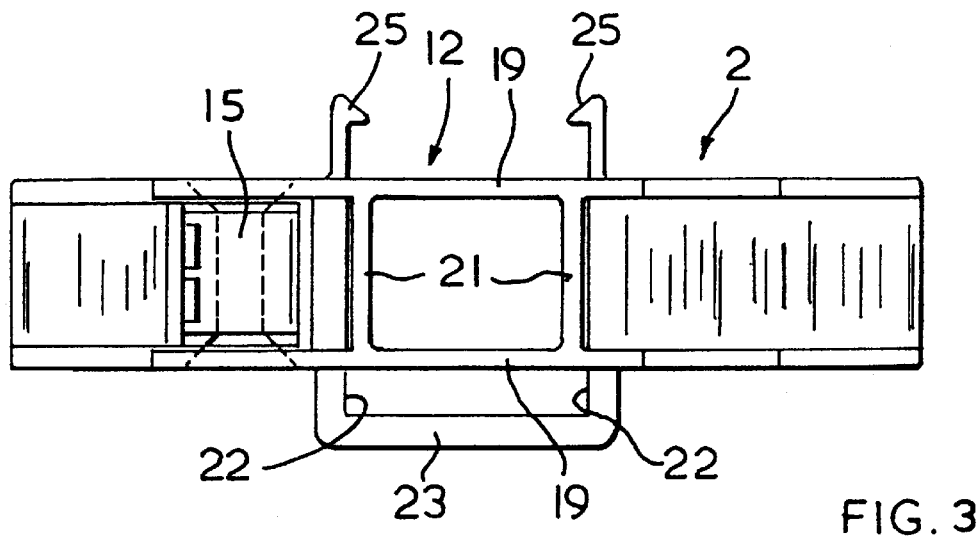
FIG. 3 is a bottom view of the pipe holding part of FIG. 1.

In FIG. 1 to FIG. 3, pipe holding part 2 comprises a plurality of pipe gripping parts 6, 7, 8, 9, 10 that, as required, accommodate and hold a pipe when a pipe is pushed in, and a base 12 that accommodates and holds securing part 3. Each of pipe-gripping parts 6, 8 to 10 is respectively provided with a withdrawal-preventing flap 13 that prevents withdrawal of a pipe once the pipe has been received. In the embodiment shown, one pipe-gripping part 7 is formed such that it can hold pipes of different diameters. This pipe-gripping part 7 is formed with a fixed receiving face 14 for receiving large-diameter pipes and a swingable receiving face 15 for receiving smaller-diameter pipes, and is provided with a withdrawal-preventing flap 17 that engages with larger-diameter pipes and another withdrawal-preventing flap 18 that engages with smaller-diameter pipes. As is clear from the bottom face view of FIG. 3, the bottom face in the region of swingable receiving face 15 is open, such that receiving face 15 can swing downwards in FIG. 2. Pipe-gripping part 7 can therefore hold pipes of different diameter.

Base 12 is formed as an accommodating part that accommodates securing part 3 in the middle of pipe holding part 2. In order to accommodate securing part 3, base 12 comprises, at the bottom face of pipe holding part 2, two pairs of frame elements 19, 19, 21, 21, forming integrally from the bottom face thereof a horizontal rectangular frame; at the upper face of pipe holding part 2, a pair of guides 22 that, from the upper face thereof, integrally form a frame whereof one side is open and which is horizontal and rectangular; and a guide frame element 23 that connects these guides; the portion outside these frame elements constitutes a space for an accommodation portion for receiving the securing portion. The frame elements 19, 21 on the underside of base 12 serve to ensure the rigidity of base 12. These frame elements, so long as they can accommodate securing part 3 and ensure rigidity whilst forming a space in such an accommodated securing part through which a stud can pass are not restricted to actual frame elements but could be of any desired shape, for example they could be formed by a plate-shaped body open in the middle. Also, in base 12, underside frame elements 19 and upper guide frame element 23 are separated by a length such as to form a space 24 that can accommodate the bottom of securing part 3.

Upper guide 22 and guide frame element 23 fit by sliding on to and hold securing part 3 (as will be described, more precisely, the securing part fitted with the anti-vibration member) and, as best shown in FIG. 1, form a frame which, in plan view, is rectangular with one side open. A space to receive securing part 3 is formed in the area enclosed by guides 22 and guide frame element 23 and the securing part 3 is accommodated in this space. The frame aperture that is formed by guides 22 and guide frame element 23 constitutes an inlet for the insertion of securing part 3; guide frame element 23, apart from ensuring rigidity of base 12, functions as a stop for securing part 3 which is slidably accommodated therein, so that securing part 3 is held located in an appropriate position. The pair of guides 22 have the function of joining securing part 3 to pipe holding part 2 by fitting into the guide grooves formed in the side faces of securing part 3 (more precisely, the anti-vibration member of the securing part fitted with the anti-vibration member). Withdrawal-preventing claws 25 for preventing withdrawal of a securing part once this has been accommodated are formed at the ends of guides 22 on the inlet side. As shown, these withdrawal-preventing claws 25 are formed as resilient claws that permit sliding of securing part 3 in the insertion direction, but prevent withdrawal once this has been accommodated. In order to make it possible to remove securing part 3, the tips of withdrawal-preventing claws 25 project, and are such that they can be flexed outwards.

Details of the securing part 3 are shown in FIG. 4 to FIG. 8.

Figure 4:
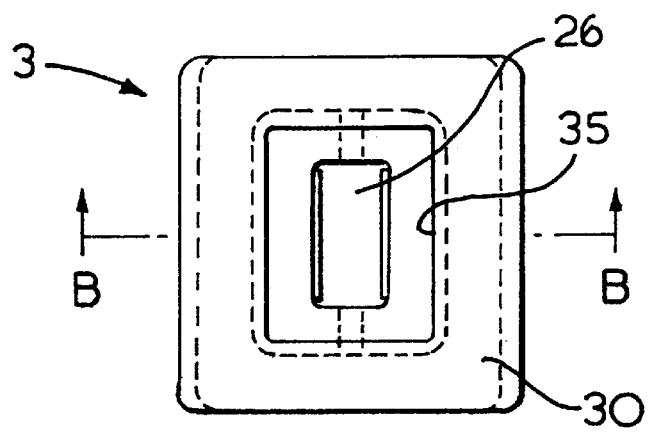
FIG. 4 is a plan view of a securing part of an anti-vibration holding element according to the first embodiment of the invention.
Figure 6:
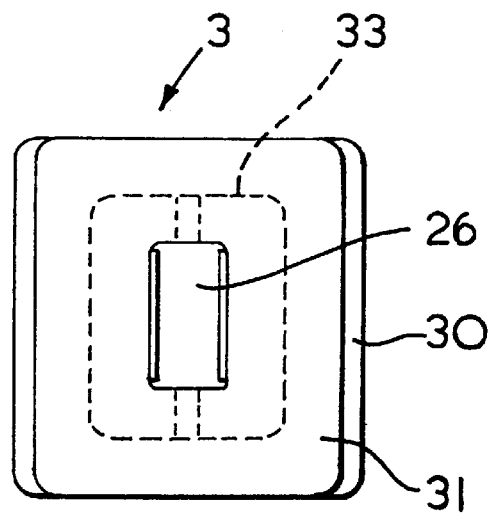
FIG. 6 is a bottom view of the securing part of FIG. 4.

Securing part 3 is mounted on the body using a screw or a stud formed with a plurality of circumferential grooves erected on the body of a vehicle, for example. Securing part 3 is therefore provided with a stud-receiving hole 26 at its centre. As shown in FIG. 4 and FIG. 6, this stud receiving hole 26 is not formed as a hole of circular shape or square shape, but as a slot. The reason why it is thus formed as a slot is in order to make it possible to absorb any discrepancy arising if the pitch of a plurality of studs differs from the pitch of a plurality of holding elements on the pipe. In general, in the case of a pipe that extends in a prescribed design over the body, in order for the pipe to be fixed to respective studs provided at a prescribed plurality of locations on the body, anti-vibration holding elements 1 are fixed beforehand at prescribed intervals along the pipe, matching the positions of the studs; pipes are delivered with such anti-vibration holding elements fitted, ready for mounting on studs on the body. Thus, if the pitch of the studs differs from the pitch of the holding elements, if the stud-receiving holes of the holding elements are square, the studs do not coincide with the receiving holes of the holding elements and it is therefore difficult to engage the holding elements on the studs. By forming the stud-receiving holes as slots, such discrepancy of pitch of the studs can be absorbed.

Figure 7:
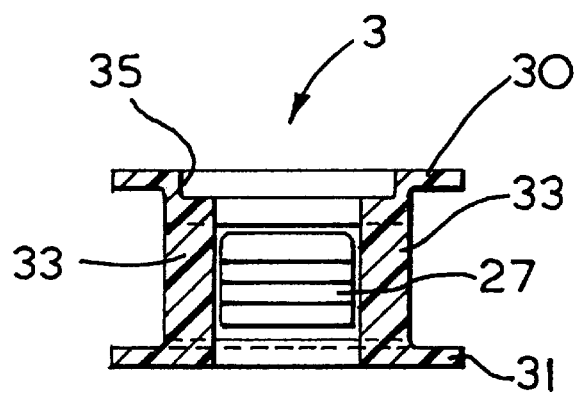
FIG. 7 is a cross-sectional view along the line A—A of the securing part of FIG. 5.
Figure 8:
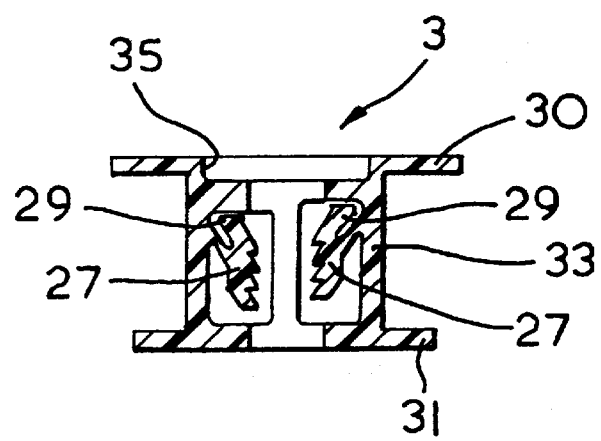
FIG. 8 is a cross-sectional view along the line B—B of the securing part of FIG. 4.

The inlet surface of the stud-receiving hole of the securing part 3 is formed with a pair of engagement claws 27, 27 that engage threaded grooves or circumferential grooves of the stud. In this embodiment, a projection 29 that restricts movement of engagement claw 27 in the direction of the stud root even if an attempt is made to withdraw securing part 3 from the stud is provided at the upper end of engagement claw 27. Also, engagement claw 27 is formed with multiple steps so as to provide a large number of engagement faces with the stud. This is convenient in that, although force is not required to push on to the stud, a large withdrawal-preventing force is maintained. However, it is not essential for engagement claw 27 to be constructed as above and an engagement claw of any commonly used shape could be employed so long as it enables engagement by pushing on to the stud and prevents withdrawal. Preferably, as shown in FIG. 7, engagement claws 27 are formed in flat plate shape matching the slot of stud receiving hole 26; they can thereby engage the stud over a wide range, enabling discrepancy of stud pitch to be absorbed.

Figure 5:
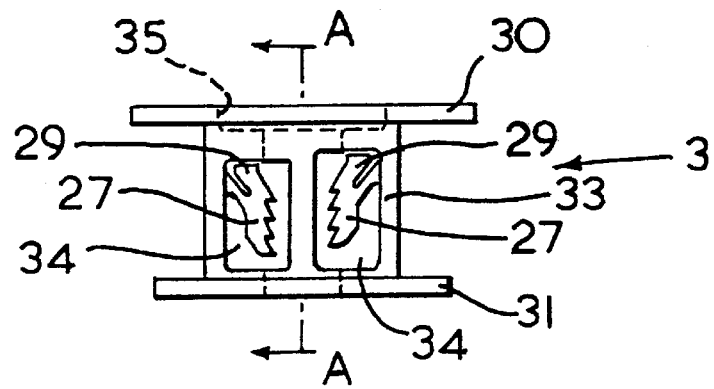
FIG. 5 is a front view of the securing part of FIG. 4.

Anti-vibration member 5 is mounted on securing part 3 such that it is wrapped around its peripheral surface constituting its side face. At both ends (upper end and lower end) of securing part 3, seen in the direction of pushing-on to the body i.e. the direction going upwards in FIG. 5, there are formed respectively an upper flange 30 and lower flange 31 on securing part 3, in order to prevent anti-vibration member 5 mounted thereon from being detached in the direction of pushing-on to a stud erected on the body (vertical direction in FIG. 5), a space whereby anti-vibration member 5 is received and held being formed between upper flange 30 and lower flange 31. Thanks to these flanges 30 and 31, there is no possibility of anti-vibration member 5 coming off securing part 3 even if securing part 3 is subjected to force pushing it on to the stud or withdrawing securing part 3 from the stud. It should be noted that, as shown in FIG. 5 and FIG. 6, upper flange 30 is formed projecting further outwards in the left and right direction than lower flange 31. The length of this upper flange 30 is formed larger than the width of the aperture portion of space 24 (length in the left and right direction of FIG. 2) formed on the base 12 of pipe holding part 2, so that upper flange 30 cannot be inserted into space 24. Engagement claws 27 are provided on securing part 3 so that securing part 3 is fixed in direction with respect to the stud, in order to achieve engagement on to the stud. Thanks to the long upper flange 30, although securing part 3 fitted with anti-vibration member 5 can be inserted on to base 12 in a correctly oriented condition with upper flange 30 uppermost, in the downwardly-directed, incorrect condition, it cannot be joined with base 12 of pipe holding part 2. In this way, securing part 3 is mounted in the correct direction of pipe holding part 2 and the engagement claws 27 of securing part 3 are correctly engaged with respect to the pushing-on direction on to the stud. Lower flange 31 is formed shorter than the width of the aperture portion of space 24 of base 12 so that it can be received in space 24.

The axial part 33 of securing part 3 is formed by a pair of wall portions and another pair of supporting pillar portions, enclosing stud receiving hole 26; windows 34 for the formation of engaging claws 27 are formed at the side where the supporting pillar portions are provided. The height of axial part 33 and the size of its periphery in horizontal cross-section are determined so as to match the size of the space formed by guides 22 and guide frame element 23 of base frame 12 and the size of anti-vibration member 5 that surrounds the periphery of axial part 33. In other words, when securing part 3, surrounded by anti-vibration member 5, is inserted by sliding into the space formed by guides 22 and guide frame element 23 of base 12, it is made to be of a size whereby it is joined to pipe holding part 2. This size can be any desired dimension so long as securing part 3 fitted with anti-vibration member 5 is joined to base 12. Also, picking up of the tip of a stud erected on the body is facilitated by forming on upper flange 30 a recess 35 surrounding stud receiving hole 26 but larger than this. As a modification of recess 35, it is possible to provide tapering from the entrance to the recess towards the stud receiving hole, the thickness in the height direction of flange 30 being made larger. This is convenient because, if the tip of the stud is picked up by the widely opened recess when anti-vibration holding element 1 that has been connected with securing part 3 is pushed on to the stud, the entire anti-vibration holding element 1 is guided during this pushing-on movement, such that the stud-receiving hole is guided on to the tip of the stud.

Figure 9:
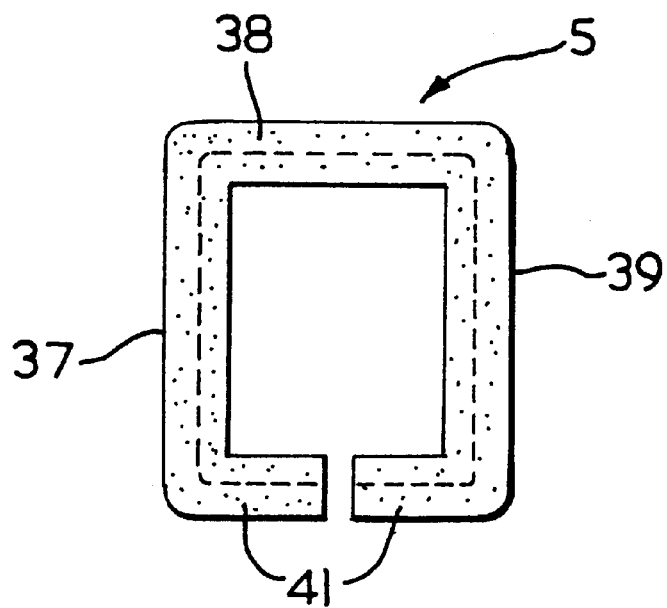
FIG. 9 is a plan view of an anti-vibration member of a first embodiment of the invention.
Figure 10:
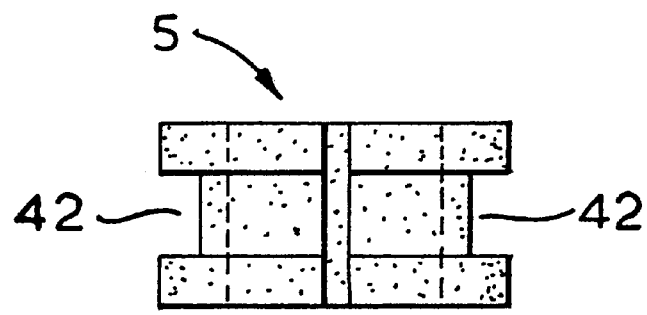
FIG. 10 is a front view of the anti-vibration member of FIG. 9.

Details of anti-vibration member 5 are shown in FIG. 9 and FIG. 10. Anti-vibration member 5 is integrally formed of for example natural rubber or synthetic rubber which are commonly used as vibration-absorbing materials. Its size and shape are determined such that it has a height that can be accommodated in the space between upper flange 30 and lower flange 31 of securing part 3, and can surround axial part 33 of securing part 3, and such that it can fit into the space formed by guides 22 and guide frame element 23 of the base of pipe holding part 2. In this embodiment, it is formed by four sides 37 to 39 and 41 that form a rectangular shape, matching the space defined by guides 22 and guide frame element 23 and securing part 3. Of these sides, the three sides 37 to 39 are continuous but the other side 41 is severed in the middle. By means of this severed portion, side 41 can be opened out wider than axial part 33, enabling anti-vibration member 5 to be mounted on axial part 33 of securing part 3 in a simple manner, such as to surround it. On anti-vibration member 5, as shown in FIG. 10, on the outside portions of sides 37 to 39 there are formed grooves 42 that fit slidably on to guides 22 and guide frame element 23 of base 12 of pipe holding part 2. A groove 42 is also formed on side 41 so that withdrawal-preventing claws 25 that extend from guides 22 can fit into this groove 42. Thus anti-vibration member 5 is connected to base 12 by guides 22 and guide frame element 23 by means of these grooves 42. Since anti-vibration member 5 is mounted so as to surround the outer peripheral surface of axial part 33 of securing part 3, anti-vibration member 5 performs the function of mounting securing part 3 on base 12 of pipe holding part 2.

The size and shape of anti-vibration member 5 are determined by securing member 3 and base 12, but alteration of the shape may be performed to match for example the anti-vibration characteristic, for example the frequencies etc. of vibration that are to be absorbed. FIG. 11 shows a partial external view of an anti-vibration member having an anti-vibration characteristic different from that of anti-vibration member 5 shown in FIG. 9 and FIG. 10. In this way, several types of anti-vibration member of different anti-vibration characteristics may be prepared and an anti-vibration member matching the required anti-vibration characteristic may be used for mounting on to the securing part. Also, as another modification, anti-vibration member 5 may be integrally formed in the manufacturing of securing part 3; in this way, the time required for mounting the anti-vibration member on to the securing part can be eliminated.

Assembly and mounting of anti-vibration holding element 1 will now be described with reference to FIG. 12 to FIG. 17. In FIG. 12, side 41 of anti-vibration member 5 is opened out and, as shown by arrow 43, anti-vibration member 5 is mounted on to axial part 33 of securing part 3 so as to surround it. FIG. 13 shows anti-vibration member 5 integrally joined to securing part 3. As shown by the arrow 45 of FIG. 14, securing part 3 with anti-vibration member 5 mounted thereon is slidingly inserted in the direction at right angles to the direction of pushing-on securing part 3, into the space of base 12 of pipe holding part 2 that accommodates securing part 3.

In this insertion operation the pair of guides 22 of base 12 are lined up so that they can be inserted in the pair of grooves 42 formed on the side faces of anti-vibration member 5 of securing part 3 and securing part 3 is then directly slid on. When anti-vibration member 5 of securing part 3 reaches guide frame element 23, withdrawal is prevented by locking of withdrawal-preventing claws 25 in a condition in which securing part 3 fitted with anti-vibration member 5 is accommodated in base 12. In this condition, merely by fitting anti-vibration member 5 on to guides 22 and guide frame element 23 of base 12, anti-vibration member 5 connects securing part 3 and pipe holding part 2. Consequently, since there is no possibility of direct contact of securing part 3 with pipe holding part 2, vibration of pipe holding part 2 cannot be directly transmitted to securing part 3 and also vibration of securing part 3 cannot be directly transmitted to pipe holding part 2; thus vibration is reliably absorbed by the intervening anti-vibration member 5. Also, even when anti-vibration member 5 has no rigidity due to being made of rubber or the like, since this anti-vibration member 5 is mounted on securing part 3 of high rigidity, high rigidity of securing part 3 fitted with the anti-vibration member is maintained, and the connection strength of securing part 3 and pipe holding part 2 is maintained at a high level.

FIG. 15 shows the configuration when assembly as anti-vibration holding element 1 is completed by accommodating securing part 3 fitted with an anti-vibration member in base 12 of pipe holding part 2, and rigid connection of securing part 3 and pipe holding part 2 by means of anti-vibration member 5. As shown in FIG. 16, a plurality of pipes 46, 47 constituting members to be mounted are held by pushing on to pipe-gripping parts 6 to 10 of pipe holding part 2 in anti-vibration holding element 1. Pipes 46 and 47 are shown as having different diameters. Pipes 46 and 47 extend for a long distance and a plurality of anti-vibration holding elements 1 are mounted on these pipes 46, 47 at prescribed intervals. For example, assembly of anti-vibration holding elements 1 on to the pipes is done by the pipe manufacturer and a set of pipes fitted with anti-vibration holding elements are delivered to an automobile manufacturer. As shown in FIG. 17, rod-shaped studs 50 formed with screw-threads (or a plurality of circumferential grooves) are erected at prescribed locations on body 49 such as the body of an automobile. By bringing in the set of pipes fitted with anti-vibration holding elements 1 up to these locations, they can be mounted at the prescribed locations on body 49 using studs 50.

By locating vibration preventing holding elements 1 mounted on the pipes in position such that the tips of studs 50 are picked up in the recesses 35 formed in upper flanges 30 of the securing parts 3, studs 50 are pressed on to body 49 such that studs 50 are received in the stud-receiving holes 26 of securing parts 3. In FIG. 17, anti-vibration holding element 1 is pressed upwards against body 49. By means of this pushing-on, engagement claws 27 of securing part 3 ascend while engaging the screw-threaded grooves of stud 50; when anti-vibration holding element 1 reaches the uppermost position, by the action of engagement claws 27, securing part 3, and hence anti-vibration holding element 1, are held in this position. It should be noted that although, when anti-vibration holding element 1 is raised, a force acts to prevent raising due to the pipe that is held by the pipe holding member 2, so that a force acts tending to withdraw anti-vibration member 5 downwards from securing part 3, due to the provision of lower flange 31 on securing part 3, anti-vibration member 5 cannot be withdrawn from securing part 3. Also, when adjusting the pipe position after pipe mounting, even if the pipe is directly carried, there is no possibility of the pipe becoming detached or of the connection with the securing part being detached. Furthermore, in this case, when pushing pipe holding part 2 towards the body, even if a force acts tending to release connection with the securing part 3 through anti-vibration member 5, thanks to the provision of upper flange 30 on securing part 3, there is no possibility of anti-vibration member 5 being detached from securing part 3. Consequently, anti-vibration holding element 1 exhibits the anti-vibration function in a reliable manner and furthermore can effect connection of the member to be mounted (pipe) to the body in a reliable and firm manner.

Figure 18:
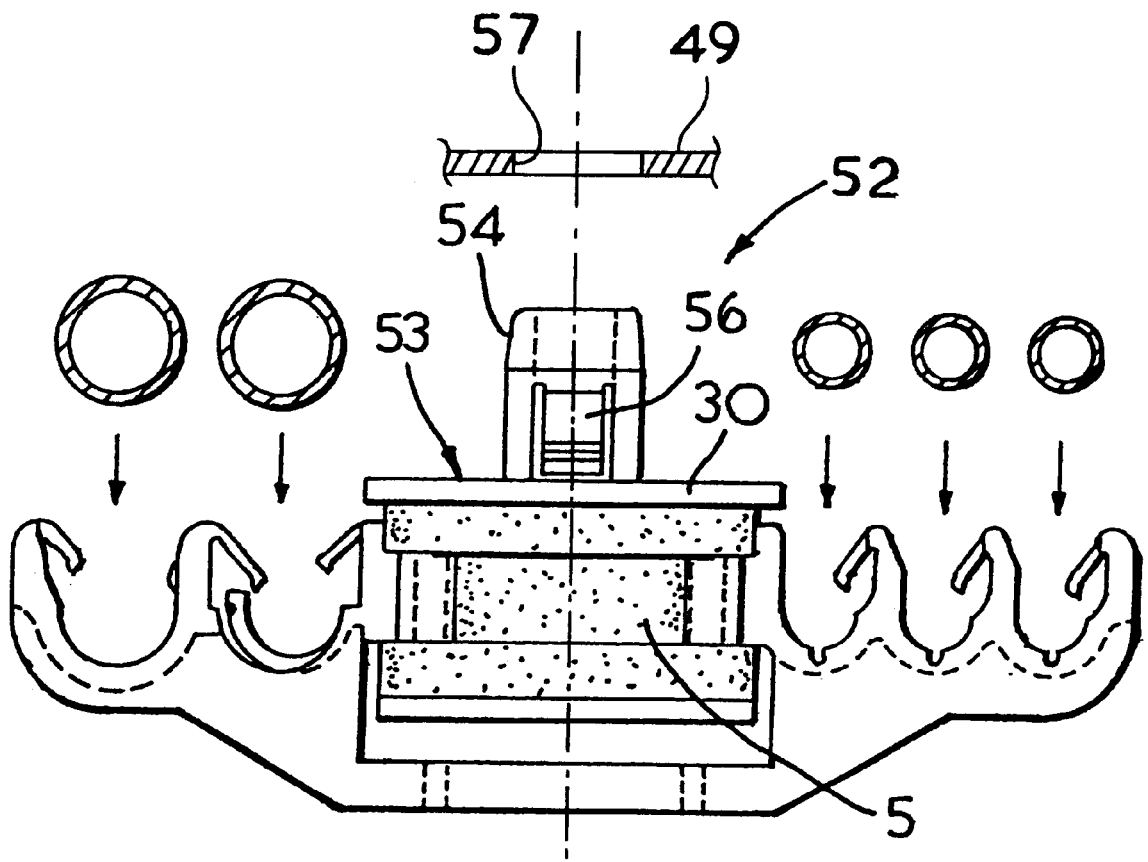
FIG. 18 is a front view after completion of assembly of an anti-vibration holding element according to a second embodiment of the invention.

FIG. 18 illustrates an anti-vibration holding element 52 according to a second embodiment. Although this anti-vibration holding element 52 is of practically the same construction as the anti-vibration element 1 of the first embodiment, it differs in that on upper flange 30 of securing part 53 a clip 54 is provided that is engaged by insertion into a hole provided in the body. Seen from above in FIG. 18, this clip 54 is formed in the shape of a rod of practically square shape, being formed with a resilient engagement claw 56 that extends outwards in inclined fashion from the middle thereof to a position adjacent flange 30. Thanks to clip 54, the labour of mounting on a stud or the like is eliminated simply by forming a mounting hole 57 in the body 49.

With this invention, the securing part is mounted in a simple and correct fashion on the body merely by pressing on to the body, the strength of the connection of the holding part of the member to be mounted and the securing part is maintained at a high level by an anti-vibration member, the mounting strength of the anti-vibration holding element on to the body is maintained at a high level, and there is no possibility of the anti-vibration material that connects the pipe holding part directly engaging the pipe holding part, so the basic anti-vibration function is maintained at a high level and furthermore the mounting member can be held by a hard holding part rather than a soft anti-vibration member, so it can be held in a stable and firm manner, the strength of mounting of the securing part is high, and there is no possibility of the mounting becoming detached.

What is claimed is:

1. An anti-vibration holding element comprising a securing part adapted to be mounted on a body and a holding part that holds a member that is to be mounted onto the body by connection with this securing part, said securing part being provided with an anti-vibration member that prevents transmission of vibration between said securing part and said holding part; wherein said securing part is formed separately from said holding part and, with said anti-vibration member, has a shape enabling fitting into a complementary portion of a base of said holding part, said anti-vibration member being provided at the periphery of said securing part and being shaped to fit on to said base of said holding part, said anti-vibration member effecting connection of said securing part and said holding part.

2. An anti-vibration holding element for pipe holding comprising a securing part that is mounted on a body and a pipe holding part having at least one pipe holder and being connected to said securing part, and being provided with an anti-vibration layer that prevent transmission of vibration between said securing part and said pipe holding part; wherein said securing part and said pipe holding part are separately formed, said pipe holding part comprising said pipe holder and a base to which the securing part is connected, an accommodating portion for receiving said securing part formed in said base, said anti-vibration layer being provided on a circumferential surface of said securing part to connect said securing part and said holding part fitting into said base.

3. The anti-vibration holding element according to claim 2 wherein the accommodating portion of the base of said pipe holding part is formed in a shape whereby said securing part fitted with the anti-vibration layer is received by inserting and sliding in a direction at right angles to a direction of pushing-on of said securing part, and a withdrawal-preventing claw is provided at a inlet of a base accommodating portion to prevent withdrawal of the securing part from said anti-vibration layer.

4. The anti-vibration holding element according to claim 3 wherein said securing part is formed with respective flanges at both ends in the direction of pushing-on, said anti-vibration layer being received between these two flanges.

5. The anti-vibration holding element according to claim 4 wherein, in the base of said pipe holding part, there are formed a pair of insertion guides extending in a sliding direction, insertion grooves matching these insertion guides being formed in side faces of said anti-vibration layer.

6. The anti-vibration holding element according to claim 2 wherein said anti-vibration layer is formed separately from the securing part and is removably mounted on said securing part.

7. The anti-vibration holding element according to claim 2 wherein the anti-vibration layer is integrally formed to surround the periphery of the securing part.

8. The anti-vibration holding element according to claim 2 wherein a mount comprising a rod-shaped stud formed with a plurality of grooves on the body is provided, said mount including an engagement claw that engages a stud-receiving hole formed in said securing part and said grooves on said stud.

9. The anti-vibration holding element according to claim 2 wherein a mount is provided, said mount comprising a clip that is engaged by insertion into a hole provided on the body, said clip being a part of said securing part.

* * * * *